(12) United States Patent
Numano et al.

(10) Patent No.: US 7,002,554 B2
(45) Date of Patent: Feb. 21, 2006

(54) INFORMATION-PROCESSING APPARATUS AND BUTTON FUNCTION CONTROL METHOD FOR USE IN THE APPARATUS

(75) Inventors: Fujihito Numano, Hamura (JP); Yuki Akiyama, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 367 days.

(21) Appl. No.: 10/179,262

(22) Filed: Jun. 26, 2002

(65) Prior Publication Data

US 2003/0048258 A1  Mar. 13, 2003

(30) Foreign Application Priority Data

Sep. 11, 2001 (JP) .............................. 2001-275496

(51) Int. Cl.
*G09G 5/00* (2006.01)

(52) U.S. Cl. ...................... 345/172; 345/158; 345/168

(58) Field of Classification Search ................ 345/172, 345/156, 157, 158, 169, 168
See application file for complete search history.

(56) References Cited

U.S. PATENT DOCUMENTS

| 5,402,492 A | * | 3/1995 | Goodman et al. ............ 726/20 |
| 5,650,799 A | | 7/1997 | Melen |
| 5,987,474 A | * | 11/1999 | Sandifer ................... 707/104.1 |
| 6,233,568 B1 | * | 5/2001 | Kara .......................... 705/410 |

FOREIGN PATENT DOCUMENTS

| JP | 8-241144 | 9/1996 |
| JP | 10-228451 | 8/1998 |
| JP | 2001-147762 | 5/2001 |

* cited by examiner

*Primary Examiner*—Xiao Wu
*Assistant Examiner*—Jean Lesperance
(74) *Attorney, Agent, or Firm*—Finnegan, Henderson, Farabow, Garrett & Dunner, L.L.P.

(57) ABSTRACT

An apparatus includes a button to which a to-be-executed program can be assigned. The apparatus further includes a unit which executes the program in response to an operation of the button, a unit which executes a button function setting process base on a request for setting of the button function for executing the program, and a unit which controls the execution of the button function setting process, depending upon a user authority level of the user who has made the request for the setting of the button function.

6 Claims, 10 Drawing Sheets

INFORMATION-PROCESSING APPARATUS AND BUTTON FUNCTION CONTROL METHOD FOR USE IN THE APPARATUS

CROSS-REFERENCE TO RELATED APPLICATIONS

This application is based upon and claims the benefit of priority from the prior Japanese Patent Application No. 2001-275496, filed Sep. 11, 2001, the entire contents of which are incorporated herein by reference.

BACKGROUND OF THE INVENTION

1. Field of the Invention

The present invention relates to an information-processing apparatus and a button function control method for controlling a button function used in the apparatus.

2. Description of the Related Art

Recently, various types of portable personal computers, such as notebook-type and laptop-type computers, have been developed. These computers have various functions for enhancing their operability.

As one of such functions, a "button function" is known. This function is used to activate a particular application program by operating a hardware button (external input button) provided on a computer body. An application program, such as an Internet browser or e-mail software, is pre-assigned to each button. When each button is depressed, a corresponding application program is automatically activated. Accordingly, users can obtain sufficient operability simply by assigning, to each button, an application program often used.

Recently, the introduction of portable computers has been promoted not only for home and for mobile use, but also in offices, in order to make more space available. In offices, however, it is necessary to provide a mechanism for limiting the range of use of the aforementioned "button function". This is because, without such a limitation, any user can use the "button function" and assign their desired application to each button, which makes it difficult for the computer manager to centralize computer management.

BRIEF SUMMARY OF THE INVENTION

It is an object of the invention to provide an apparatus and button function control method for controlling the range of use of a button function.

According to an embodiment of the present invention, there is provided an apparatus including a button to which a to-be-executed program can be assigned, comprising: means for executing the program in response to an operation of the button; means for executing a button function setting process based on a request for setting of a button function for executing the program, the button function setting process including a process to designate the program to be executed in response to the operation of the button; and means for controlling execution of the button function setting process, depending upon an authority level of a user who has made the request for the setting of the button function.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
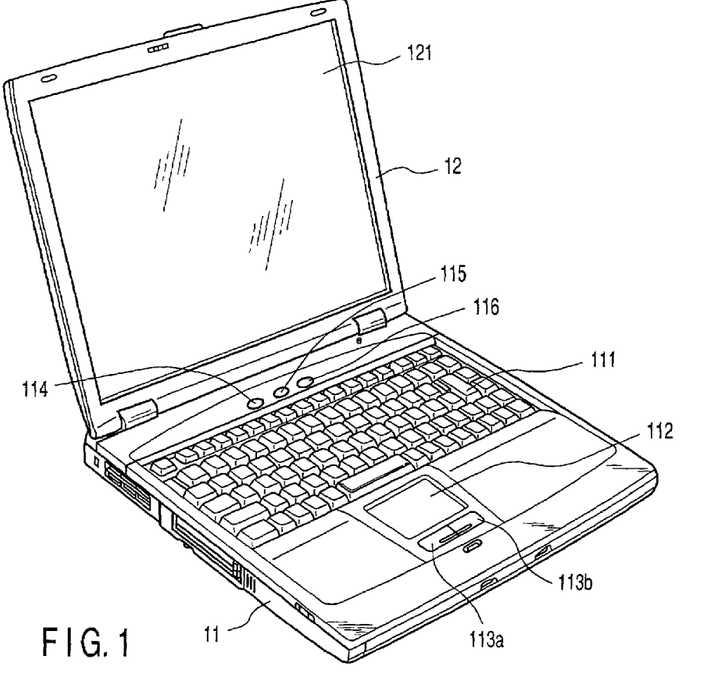
FIG. 1 is a perspective view of the outward appearance of a computer according to an embodiment of the invention, illustrating a state in which the display is open.
Figure 2:
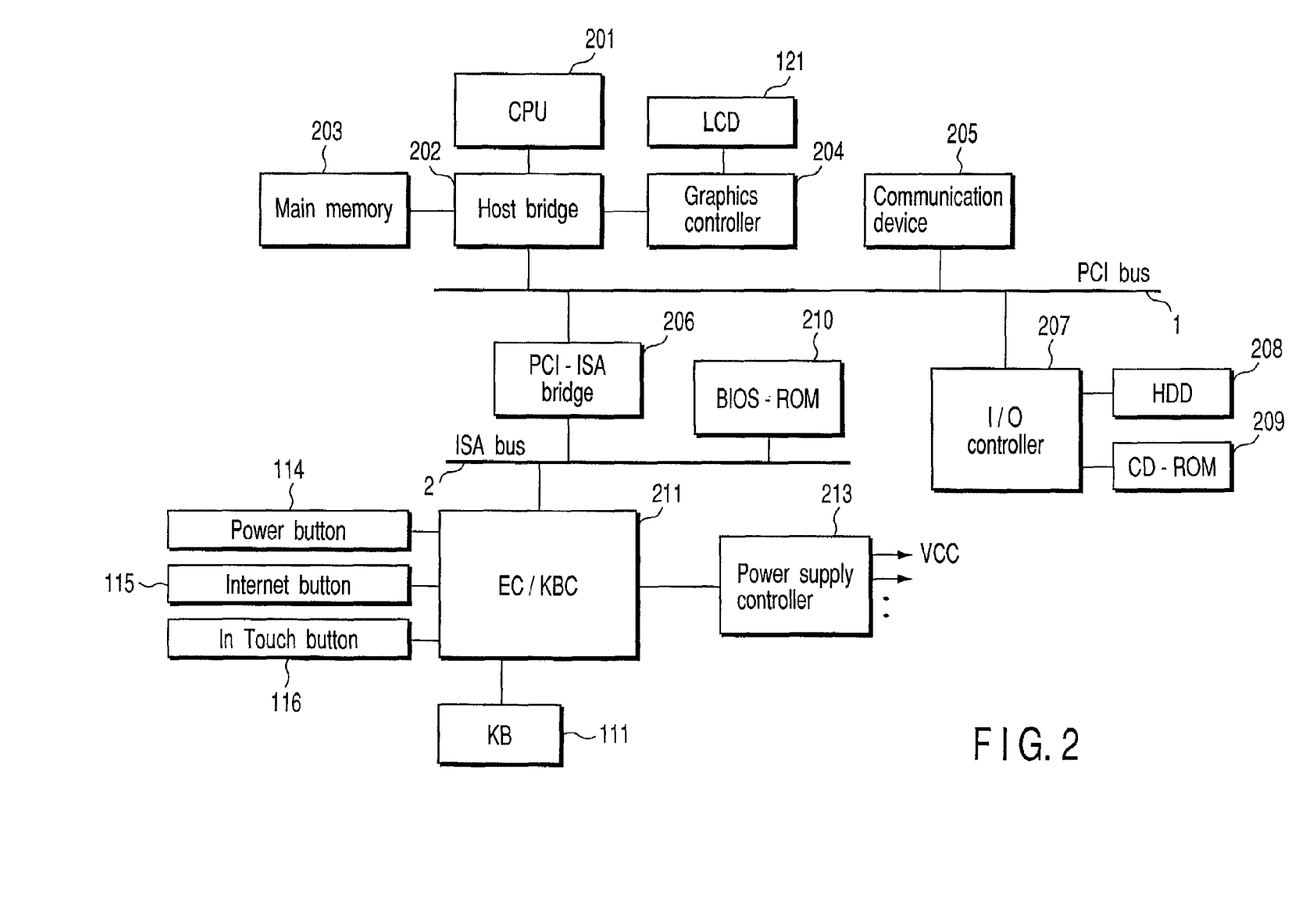
FIG. 2 is a block diagram illustrating the system configuration of the computer of the embodiment.

An information-processing apparatus according to an embodiment of the invention will be described with reference to the accompanying drawings. Referring first to FIGS. 1 and 2, the configuration of the information-processing apparatus of the embodiment will be described. In this embodiment, the information-processing apparatus is a notebook-type personal computer.

FIG. 1 is a front view of the computer, showing a state in which its display unit is open. The computer comprises a computer body 11 and a display unit 12. The display unit 12 incorporates a display screen 121 formed of an LCD (Liquid Crystal Display). The display unit 12 is attached to the computer body 11 such that it can rotate between an open position and a closed position. The computer body 11 is shaped like a thin box, and is provided with a keyboard 111, a pad-type pointing device 112 and left and right buttons 113a and 113b, etc., on the upper surface of the computer body 11.

Further, a power button 114 for turning on/off the computer and two program activating buttons 115 and 116 are provided on a rear end portion of the upper surface of the computer body 11. The program activating buttons 115 and 116 are hardware buttons (external input buttons) for executing certain system functions, and are used as operation buttons dedicated to the activation of programs for executing the certain system functions. The user operates these buttons by depressing them. The program activating buttons 115 and 116 will be referred to as an "Internet button" and "In Touch button", respectively.

Although an optional program can be assigned to each of the buttons 115 and 116, the Internet button 115 is mainly used as a hardware button for activating the Internet browser or e-mail software, while the In Touch button 116 is mainly used as a hardware button for activating an application program selected by the user.

In the embodiment, the range of use of the function of each of the Internet button 115 and In Touch button 116 is controlled in accordance with the user authority level of the current login user who is now logging into the computer.

FIG. 2 shows the system configuration of the computer. As shown, the computer comprises a CPU 201, a host bridge 202, a main memory 203, a graphics controller 204, a communication device 205, a PCI-ISA bridge 206, an I/O controller 207, a hard disk drive (HDD) 208, a CD-ROM drive 209, a BIOS-ROM 210, an embedded-controller/keyboard-controller IC (EC/KBC) 211, and a power supply controller 213, etc.

The CPU 201 is provided for controlling the operation of the computer, and executes an operating system (OS) and application/utility programs loaded from the hard disk drive (HDD) 208 to the main memory 203. The CPU 201 also executes a BIOS (Basic Input Output System) stored in the BIOS-ROM 210. The function of each of the Internet button 115 and In Touch button 116 is set using a dedicated utility program.

The host bridge 202 is a bridge device interactively connecting a local bus of the CPU 201 to a PCI bus 1. The graphics controller 204 controls an LCD display screen 121 used as the display monitor for the computer. The communication device 205 is a PCI device and is used to connect the computer to a computer network such as the Internet. The I/O controller 207 is also a PCI device and contains, for example, an IDE controller for controlling the hard disk drive (HDD) 208 and CD-ROM drive 209.

The PCI-ISA bridge 206 is a bride device that interactively connects the PCI bus 1 to an ISA bus 2. This bride contains various system devices such as a system timer, a DMA controller and an interruption controller, etc. The BIOS-ROM 210 stores the BIOS. The BIOS is a program for controlling the hardware components incorporated in the system. The BIOS includes, for example, a button event processing routine for executing an operation corresponding to a button event that occurs when the user has depressed the Internet button 115 or In Touch button 116.

The embedded-controller/keyboard-controller IC (EC/KBC) 211 is a one-chip microcomputer in which an embedded controller for power management and a keyboard controller for controlling the keyboard 111 are integrated. The embedded-controller/keyboard-controller IC (EC/KBC) 211 cooperates with the power supply controller 213 to turn on/off the computer in accordance with the operation of the power button 114. Further, when the user has depressed either the Internet button 115 or In Touch button 116, the embedded-controller/keyboard-controller IC (EC/KBC) 211 generates a button event indicative of the push of the button. The occurrence of the button event is informed of to the CPU 201 by, for example, a hardware interrupt signal from the EC/KBC 211, whereby the CPU 201 calls for the button event processing routine of the BIOS. The button event generating function of the EC/KBC 211 can be set valid or invalid for each of the Internet button 115 and In Touch button 116.

Figure 3:
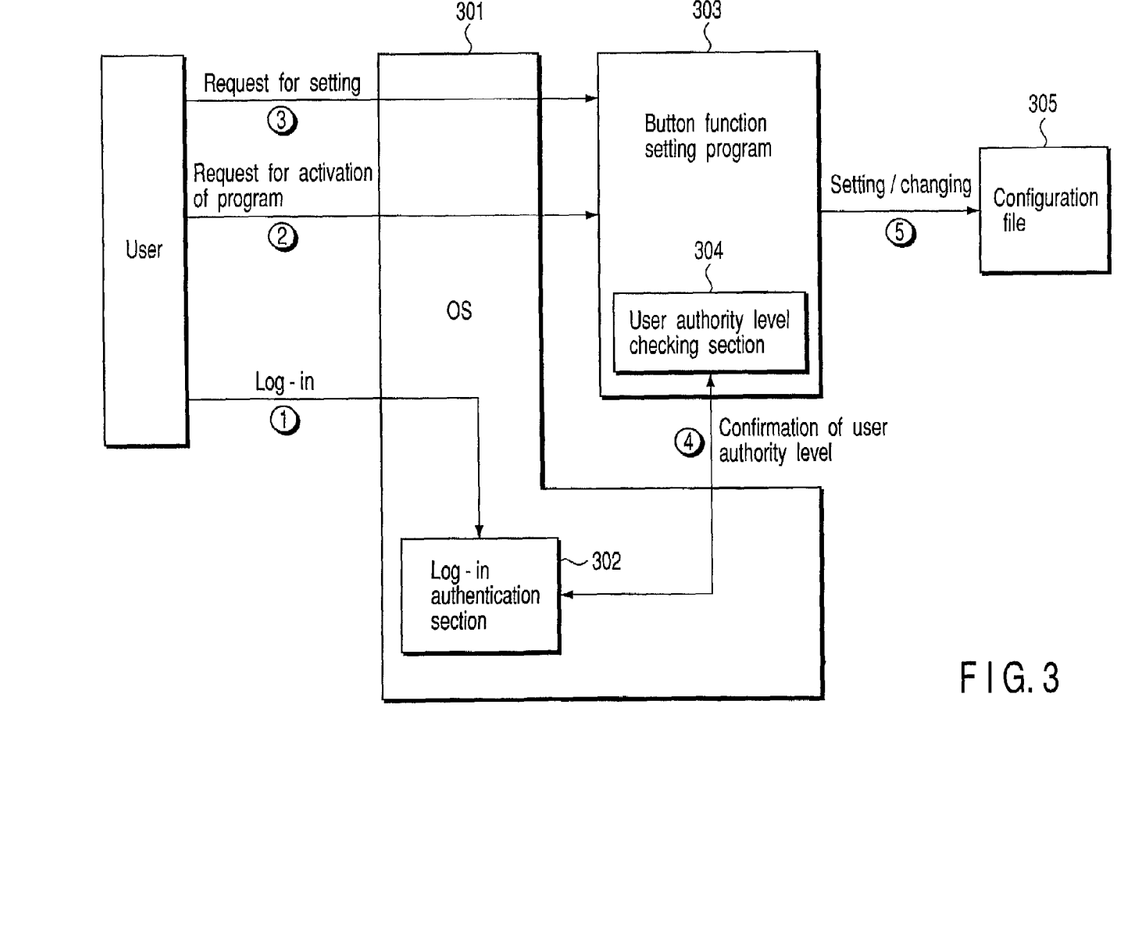
FIG. 3 is a block diagram illustrating the principle of a process for setting a button function in the computer of the embodiment.

Referring then to FIG. 3, a description will be given of the principle of the button function setting process to set up the button function for each of the Internet button 115 and In Touch button 116.

The button function setting process is used to set (or change) the button function. The button function setting process includes a process for designating or changing a program to be assigned to each button. Specifically, it includes, for example, a process for assigning a new program to one of the buttons to which no program is assigned, and a process for re-assigning a program to one of the buttons to which another program has already been assigned. The button function setting process further includes a process for enabling or disabling the button function of each of the buttons. A button function setting program 303 executes the button function setting process in order to set (or change) the button function for each of the Internet button 115 and In Touch button 116.

The button function-setting program 303 is a utility program operable on the operating system (OS) 301. In the same manner as a standard application program, the button function setting program 303 is executed in response to a request for activating the program 303, issued by the user to the OS 301. The button function setting program 303 executes the button function setting process on the basis of the request for the setting of the button function made by the user, and saves the set-up information indicating the set contents of the button function to a configuration file (registry) 305.

The configuration file 305 includes the following set-up information items for each of the Internet button 115 and In Touch button 116.

1. Enable/disable of the button function: This information indicates whether the button function for activating a program assigned to the button should be enabled or disabled. The default value indicates enable.

2. To-be-executed program: This information indicates the name of an execution file of the program to be executed when the button is depressed, or the name of a data file associated with the to-be-executed program.

3. Path: This information indicates directory path information indicative of the location of the execution file or data file managed by the file system of the computer.

4. "Button function usable authority level": This information indicates the user authority level needed to use the button function. The user having a user authority level equal to or higher than the "button function usable authority level" can use the button function.

5. "Button function settable authority level": This information indicates the user authority level needed to set (or change) the button function. The user having a user authority level equal to or higher than the "button function settable authority level" can execute a button function setting or changing operation, i.e., execute the button function setting process that includes a process for designating or changing a to-be-executed program in response to the push operation of the button.

The button function setting program 303 has a user authority level checking section 304. The user authority level checking section 304 determines the user authority level of the user who has requested the setting of the button function, by acquiring, from the OS 301, that of the current login user who is now logging into the computer. Since the user who has requested the setting of the button function is the user who is now logging into the computer, the user authority level of the user who has requested the setting of the button function can be determined by acquiring, from the OS 301, that of the user who is now logging into the computer. The user authority levels that can be managed by the OS 301 are:

1. Administrator
2. Power User
3. User
4. Guest User

The highest user authority level is "Administrator" indicating a management user, and the levels decrease in the order of "Power User", "User" and "Guest User".

A default value is preset for each of the "button function usable authority level" and "button function settable authority level". For example, the default value for the "button function usable authority level" is "Power User", and that for the "button function settable authority level" is "Administrator". Furthermore, a user, who has a user authority level equal to or higher than the present "button function settable authority level", can change the present "button function usable authority level" and "button function settable authority level", using the button function setting program 303.

A series of processes from a log-in process to the button function setting process will now be described.

(1) Log-in

Firstly, the OS 301 executes a log-in process for identifying the user who tries to login the computer. At this time, a log-in authentication section 302 incorporated in the OS 301 displays a log-in authentication screen. On the basis of user account information such as a user name input by the user on the log-in authentication screen, the user authority level of the user is identified. In accordance with the user authority level of the login user, the OS 301 manages, for example, a file operation authority, a network access authority, etc.

(2) Request for Program Activation

The user requests for the activation of the button function setting program 303 through a GUI (Graphical User Interface) provided by the OS 301. In response to the request, the OS 301 activates the button function setting program 303.

(3) Request for Setting

The button function setting program 303 displays a button function set-up screen. On the button function set-up screen, the user executes a button function setting operation for setting/changing the button function, thereby issuing a request for the setting of the button function.

(4) Confirmation of User Authority Level

When the setting of the button function has been requested, the user authority level checking section 304 checks, through the OS 301, the user authority level of the user who has requested the setting of the button function, i.e., who is now logging into the computer.

(5) Setting/Changing

If the user authority level of the user who is now logging into the computer is not lower than the "button function settable authority level", the button function setting program 303 sets or changes the set-up information stored in the configuration file 305 in accordance with the contents set by the button function setting operation, thereby setting or changing the button function. When the button function has been set disable in the button function setting process, the button function setting program 303 executes a process for invalidating a button event generating function for a corresponding button, on the embedded-controller/keyboard-controller IC (EC/KBC) 211 through the BIOS. As a result, an unnecessary interruption is prevented from occurring when the corresponding button is depressed.

On the other hand, if the user authority level of the user who has requested the setting of the button function is lower than the "button function settable authority level", the button function is not set or changed.

It is not always necessary to confirm the user authority level by the button function setting program 303. This confirmation may be executed when the log-in process is executed, using a button function management program 307 described later. The button function management program 307 acquires the user authority level of the user who is logging into the computer from the OS 301, and holds the user authority level.

Figure 4:
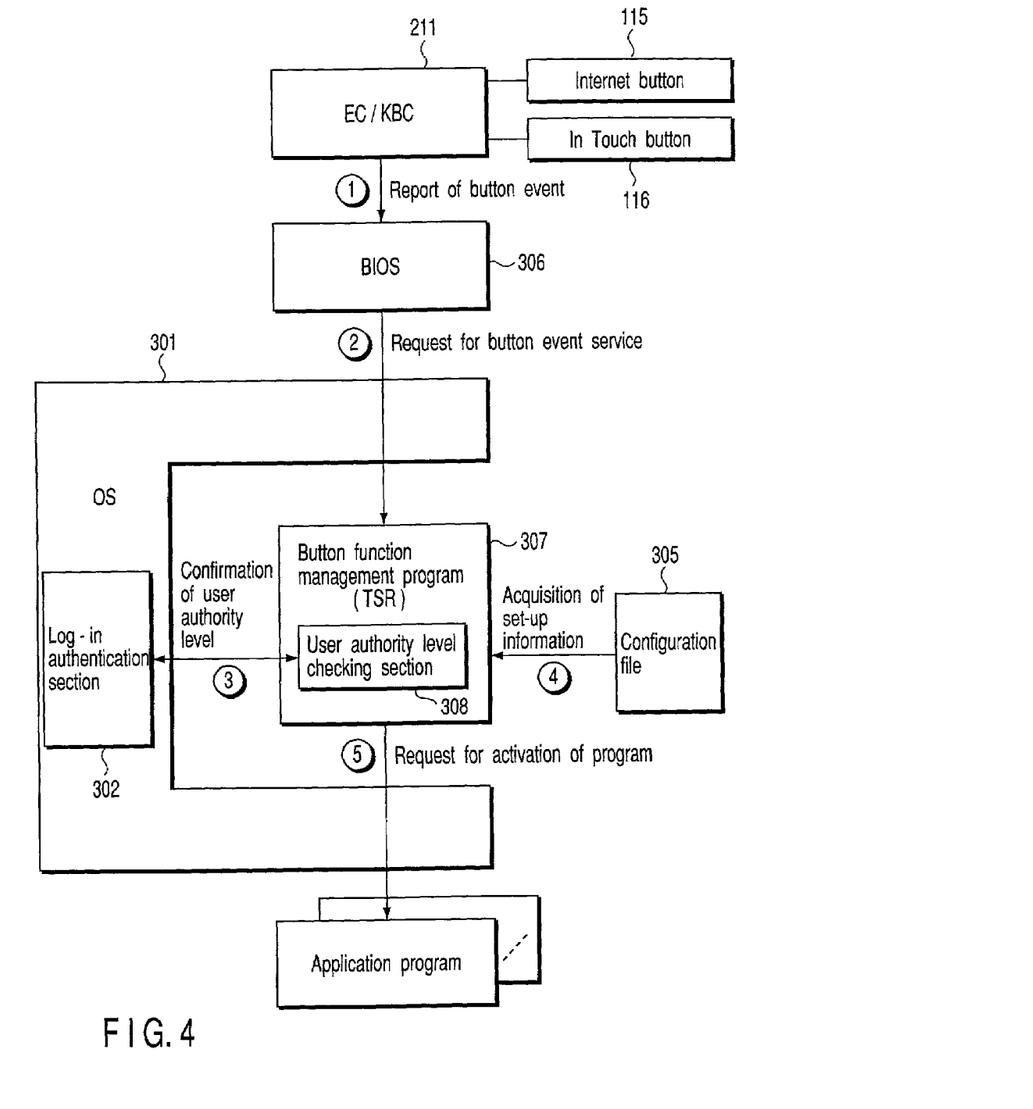
FIG. 4 is a block diagram illustrating the principle of a process for executing the button function in the computer of the embodiment.

Referring to FIG. 4, a description will be given of a series of processes executed until a program is activated after the Internet button 115 or In Touch button 116 is depressed.

(1) Report of Button Event

If the button function is enabling, the embedded-controller/keyboard-controller IC (EC/KBC) 211 always monitors the Internet button 115 and In Touch button 116. When the user has depressed the Internet button 115 or In Touch button 116, the EC/KBC 211 generates a button event, whereby the CPU 201 executes the button event processing routine of a BIOS 306.

(2) Request for Button Event Service

The BIOS 306 acquires a button code corresponding to the depressed button from the embedded-controller/keyboard-controller IC (EC/KBC) 211, and issues a request for a button service, which includes the button code. The button event service request is supplied to the button function management program 307 via the OS 301. The button function management program 307 is realized as a terminate-and-stay-resident program, and executes a service corresponding to the button event service request.

(3) Confirmation of User Authority Level

The button function management program 307 has a user authority level checking section 308. When the button function management program 307 has received a request for a button event service, the user authority level checking section 308 acquires, from the OS 301, the user authority level of the user who is currently logging into the computer, thereby determining the user authority level of the user who has depressed the button. Since the user who has depressed the button is the user who is now logging into the computer, the user authority level of the user who has depressed the button can be determined by acquiring, from the OS 301, that of the user who is now logging into the computer. It is not always necessary to execute the determination of the user authority level after the button event service request is issued. This determination can also be executed by the button function management program 307 communicating with the OS 301 at the time of log-in.

(4) Acquisition of Set-up Information

The button function management program 307 firstly acquires, from the configuration file 305, a "button function usable authority level" corresponding to the button designated by the button code. After that, the program 307 determines whether or not the user authority level of the user who has depressed the button is not lower than the acquired "button function usable authority level". If the former is lower than the latter, the button function management program 307 finishes the process. If, on the other hand, the former is not lower than the latter, the button function management program 307 acquires, from the configuration file 305, information ("execution file" or "data file" name, and directory path information) concerning a program corresponding to the button designated by the button code.

(5) Request for Program Activation

The button function management program 307 requests the OS 301 to activate the program assigned to the button that has been depressed, using the acquired information concerning the program. As a result, the program assigned to the depressed button is executed.

As aforementioned, if the determination of the user authority level is executed at the time of log-in, the button function management program 307 can determine, at the time of log-in, whether or not the user authority level of the user is lower than the "button function usable authority level". If the user authority level of the user is lower than the "button function usable authority level", the button function management program 307 can execute a process for invalidating the button event generating function, on the embedded-controller/keyboard-controller IC (EC/KBC) 211 via the BIOS 306. As a result, an unnecessary interruption can be prevented from occurring during the operation of a button. Further, in the case of employing this type of control, if the user authority level of the user who is logging in is not lower than the "button function usable authority level", the button function management program 307 needs to execute a process for validating the button event generating function, on the embedded-controller/keyboard-controller IC (EC/KBC) 211 via the BIOS 306.

Figure 5:
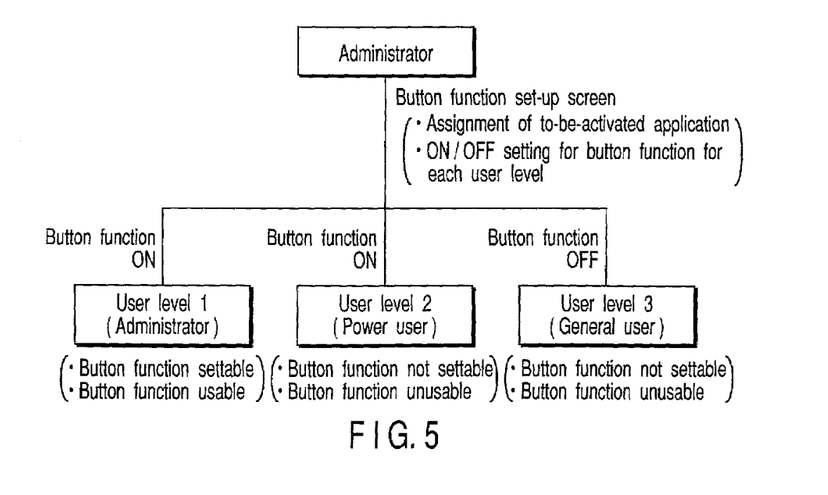
FIG. 5 is a view illustrating an example of a relationship between the user authority level and the range of use of the button function.

Referring to FIG. 5, a description will be given of an example of a relationship between the user authority level and button function usable range in the embodiment.

For example, the right of use of the button function and the right of setting of the button function are imparted to the management user whose user authority level is "Administrator". Concerning the users having the other user authority levels, the setting right is not imparted thereto, and the right of use is imparted only to the user whose user authority level is "Power User". In other words, the following range of use can be defined.

Administrator (user authority level=1): The setting of the button function is allowed. The use of the button function is allowed.

Power User (user authority level=2): The setting of the button function is not allowed.

The use of the button function is allowed.

The other users (user authority level=3): The setting of the button function is not allowed. The use of the button function is not allowed. Therefore, the button function is disable state (OFF).

Thus, the use and/or setting of the button function can be limited by determining whether the user authority level of the user who is logging in is "Administrator", "Power User", or another user (i.e., "User" or "Guest User").

Referring now to FIGS. 6–9, an example of a button function set-up screen provided by the button function setting program 303 will be described.

Figure 6:
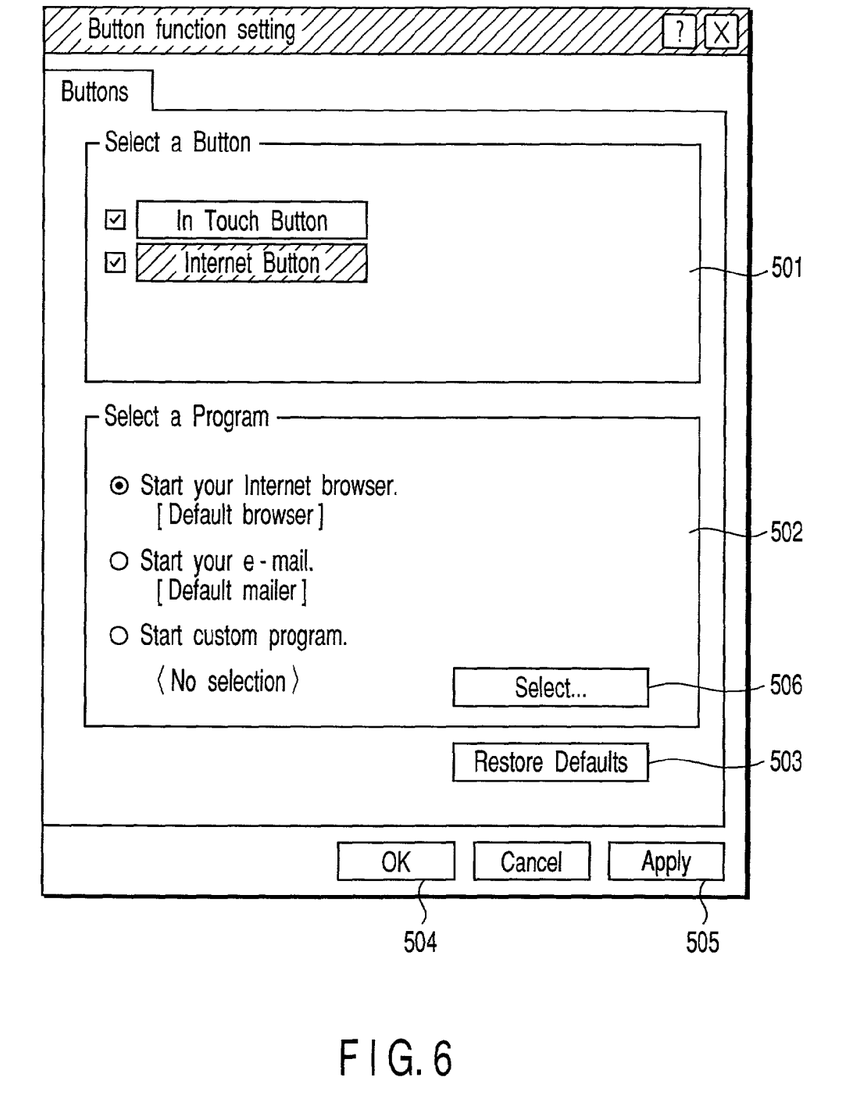
FIG. 6 is a view illustrating an example of a button function set-up screen used in the computer of the embodiment.

As shown in FIG. 6, a button selection dialog 501 is defined on the button function set-up screen. The button selection dialog 501 is used to enable or disable the button function of each of the Internet button 115 and In Touch button 116, and to select one of the buttons as a button function setting target. The button selection dialog 501 includes an "In Touch Button" icon corresponding to the In Touch button 116, an "Internet Button" icon corresponding to the Internet button 115, and check boxes corresponding to the icons. When a check box has been checked, a "button function" corresponding thereto becomes enable state (ON).

In the case of default, the respective "button functions" of the Internet button 115 and In Touch button 116 are enable states (ON).

When the user has clicked the "In Touch Button" icon or "Internet Button" icon to select it, the icon is displayed in reverse video, and a program selection dialog 502 is displayed, which is used to select a program to be assigned to the button (the Internet button 115 or In Touch button 116) corresponding to the selected icon.

As shown, the program selection dialog 502 includes three radio button icons corresponding to an Internet browser, an e-mail and another optional selection program (custom program). The Internet browser is assigned as a default program to the Internet button 115.

A "Select" icon 506 in the program selection dialog 502 is used to designate or select a program as a target of assignment from all files stored in the HDD 208. Further, a "Restore Defaults" button icon 503 in the button function set-up screen is used to restore the set-up information for the button functions to the default values.

When an "OK" button icon 504 located at a lower portion of the button function set-up screen has been selected, the "button function" setting process is executed on the basis of the present set values on the button function set-up screen. This present set values is reflected in the configuration file 305, and a process for, for example, the validation/invalidation of the button event generating function is executed. Actually, however, a process for establishing the user authority level of the user who is now logging in is executed before the button function setting process. If the user authority level of the user who is logging in is lower than the "button function settable authority level", the button function setting process is not executed.

Also, when an "apply" button icon 505 has been selected, the button function setting process is executed on the basis of the present set values on the button function set-up screen, in order to temporarily validate the present set values. Also in this case, if the user authority level of the user who is logging in is lower than the "button function settable authority level", the setting process is not executed.

Figure 7:
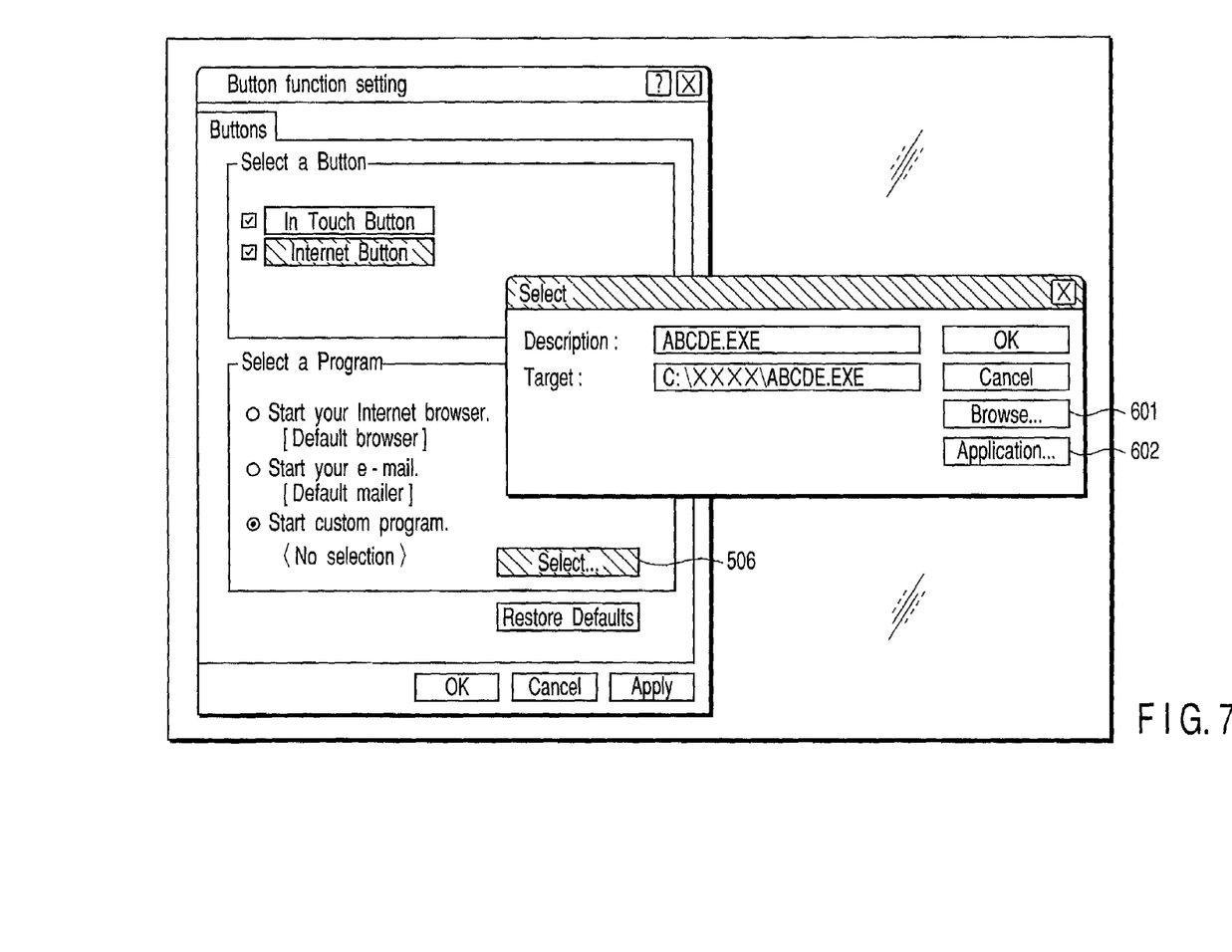
FIG. 7 is a view illustrating an example of a program select screen displayed when a "Select" button icon on the button function set-up screen of FIG. 6 has been selected.

FIG. 7 is a view illustrating a program selecting screen displayed when the "Select" button icon 506 has been selected. The program selecting screen has a "Description" field for permitting the user to input a execution file or data file name, and a "Target" field for permitting the user to input directory path information. When a "Browse" button icon 601 in the program selecting screen has been selected, a screen, on which all files stored in the HDD 208 can be referred to in units of directories, is displayed. On this screen, a program or file as a target of assignment can be selected. When an "Application" button icon 602 in the program selecting screen has been selected, a screen, on which all programs (execution files) stored in the HDD 208 can be referred to, is displayed. On this screen, a program as a target of assignment can be selected.

Figure 8:
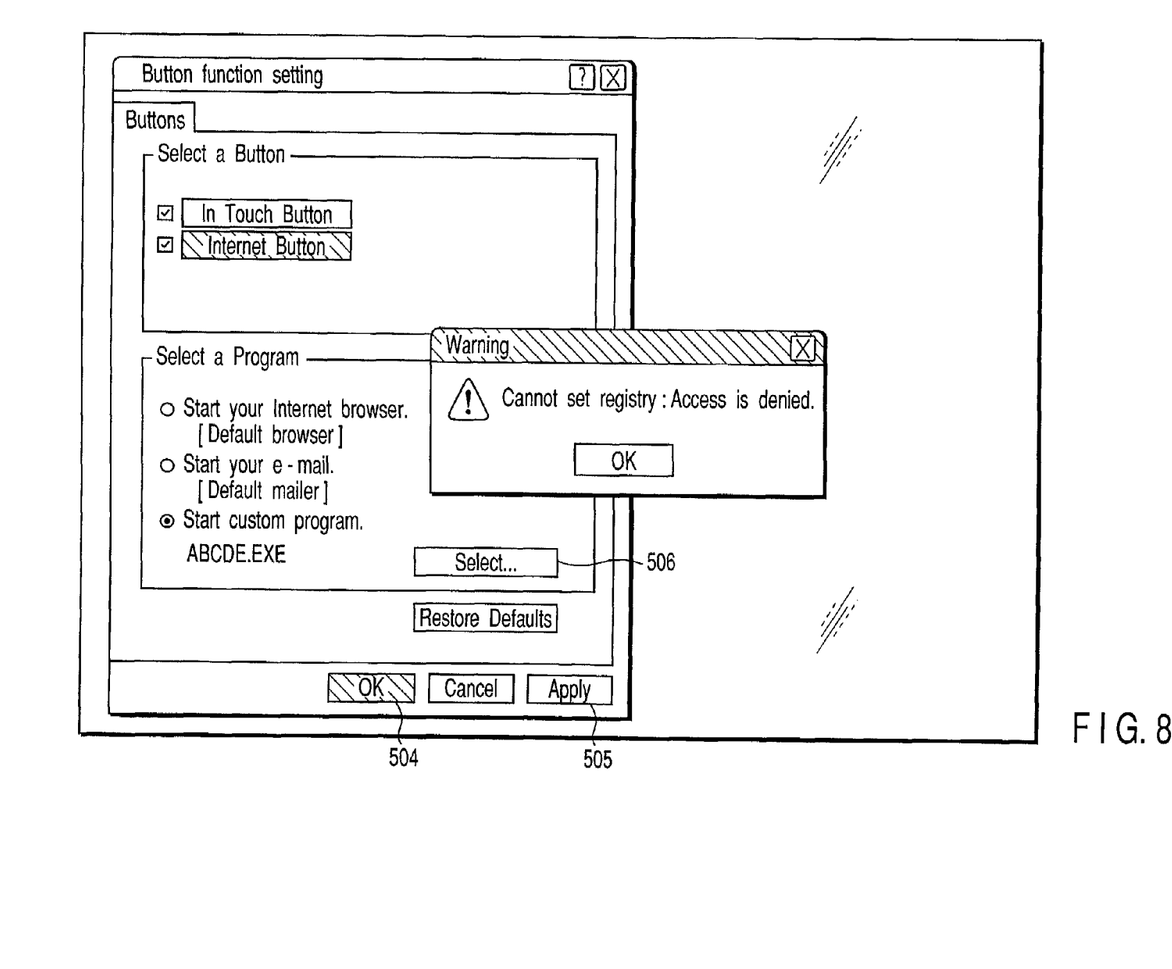
FIG. 8 is a view illustrating an example of an alarming screen displayed when an unallowable operation has been executed on the button function set-up screen of FIG. 6.

FIG. 8 shows an alarming screen displayed when the user having a user authority level lower than the "button function settable authority level" has selected the "OK" button icon 504 or "apply" button icon 505. This screen displays the warning message, informing the user that the button function cannot be set.

Figure 9:
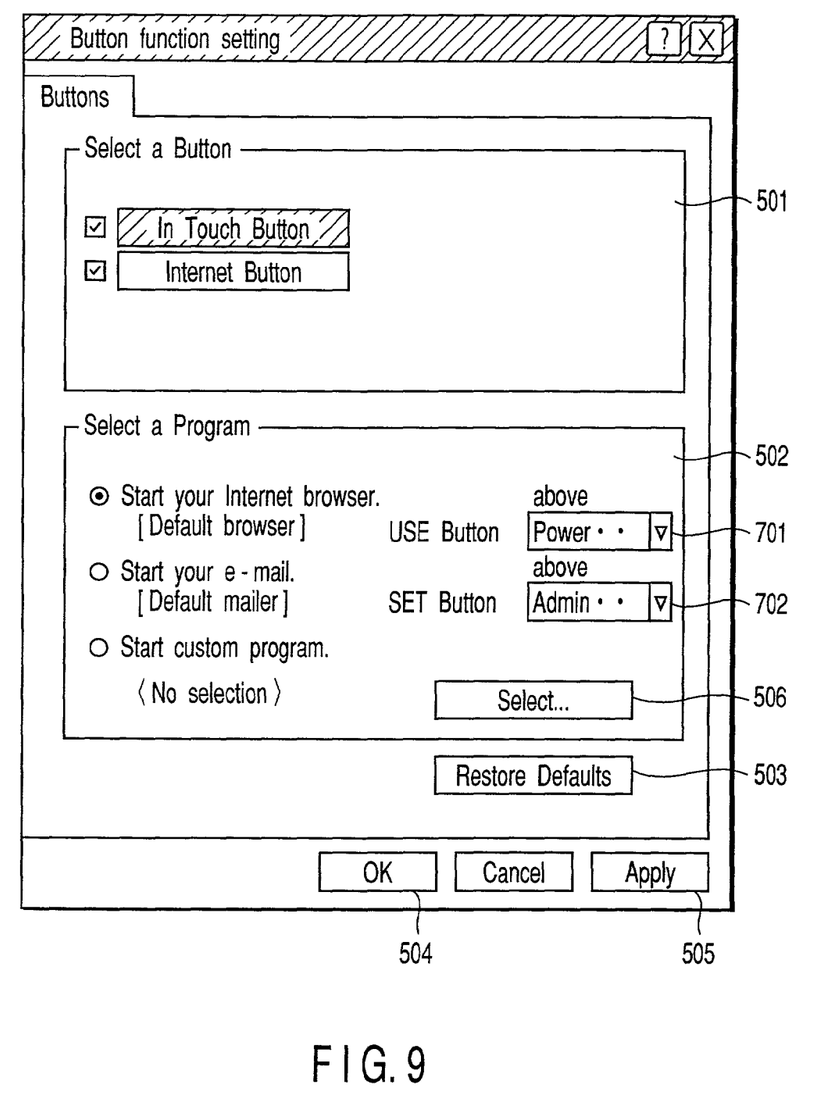
FIG. 9 is a view illustrating another example of the button function set-up screen used in the computer of the embodiment.

FIG. 9 shows a second example of the button function set-up screen. In this example, the program selecting dialog 502 includes two pull-down menus 701 and 702, in addition to the aforementioned radio buttons and "Select" button icon. The pull-down menu 701 is a button icon "USE Button" for permitting the user to designate the "button function usable authority level". The pull-down menu 702 is a button icon "SET Button" for permitting the user to designate the "button function settable authority level". If a user authority level is designated using the button icon "USE Button" 701, only those users who have a user authority level equal to or higher than the designated authority level can use the button function. If a user authority level is designated using the button icon "SET Button" 702, only those users who have a user authority level equal to or higher than the designated authority level, can set or change the button function.

Further, if a user authority level (button function usable authority level) is designated using the button icon "USE Button" 701, user authority level (button function settable authority level) designable by using the button icon "SET Button" 702 is limited to only a user authority level higher than the designated button function usable authority level, or Administrator.

Figure 10:
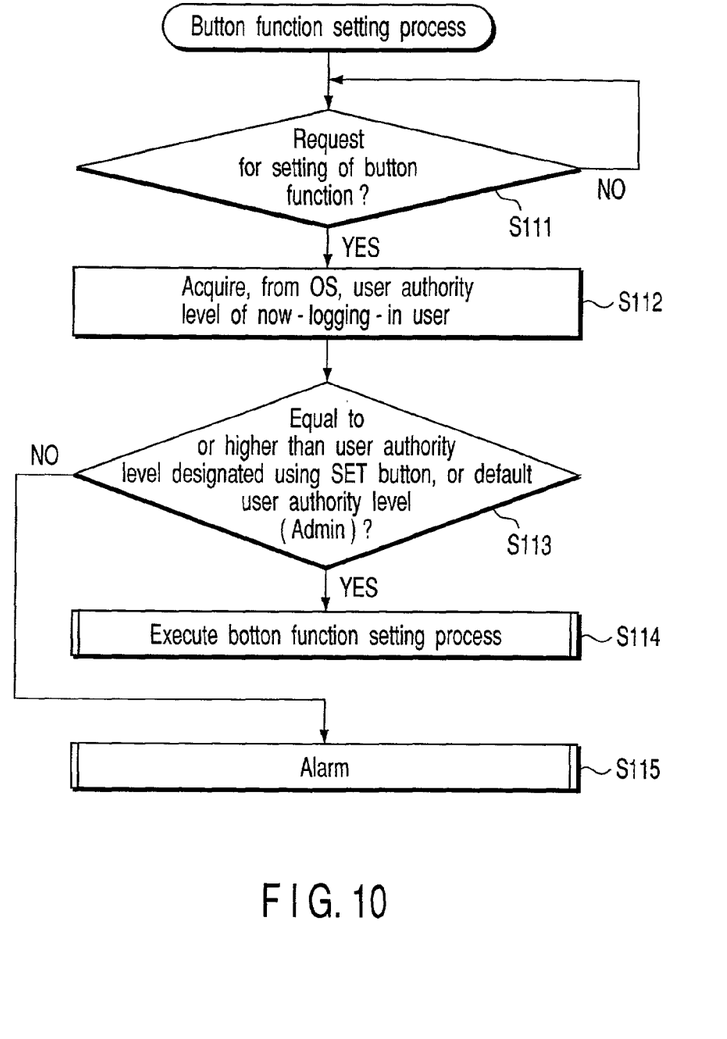
FIG. 10 is a flowchart illustrating an example of the button function setting process in the computer of the embodiment.

Referring to the flowchart of FIG. 10, a description will be given of an example of a process executed by the button function setting program 303.

After displaying the button function set-up screen, the button function setting program 303 determines whether or not the user has requested the setting of the button function (step S111). Specifically, when the user has selected the "OK" button icon 504 or "Apply" button icon 505 on the button function set-up screen, it is determined that the user has requested the setting of the button function. Naturally, when the button function setting program 303 has been activated, it may be determined that the user has requested the setting of the button function.

After the user has requested the setting of the button function (YES of the step S111), the button function setting program 303 acquires, from the OS 301, information indicative of the user authority level of the user who is logging in (this information may be acquired at the time of log-in), thereby determining the user authority level of the user who has requested the setting of the button function (step S112). Subsequently, the button function setting program 303 acquires the user authority level registered as the "button function settable authority level" in the configuration file 305, and compares it with the user authority level of the user who has requested the setting of the button function (step S113). The user authority level acquired from the configuration file 305 is the user authority level previously designated using the button icon "SET Button" 702, or the default value of the "button function settable authority level" (=Administrator).

If the user authority level of the user who has requested the setting of the button function is not lower than that acquired from the configuration file 305 (YES of the step S113), the execution of the button function setting process is allowed. In this case, the button function setting program 303 executes the button function setting process on the basis of set values on the button function set-up screen, thereby, for example, setting a program to be assigned to a target button, or changing a program already assigned thereto (step S114).

On the other hand, if the user authority level of the user who has requested the setting of the button function is lower than that acquired from the configuration file 305 (NO of the step S113), the execution of the button function setting process is inhibited. In this case, the button function setting program 303 displays the alarming screen previously mentioned with reference to FIG. 8 (step S115).

Figure 11:
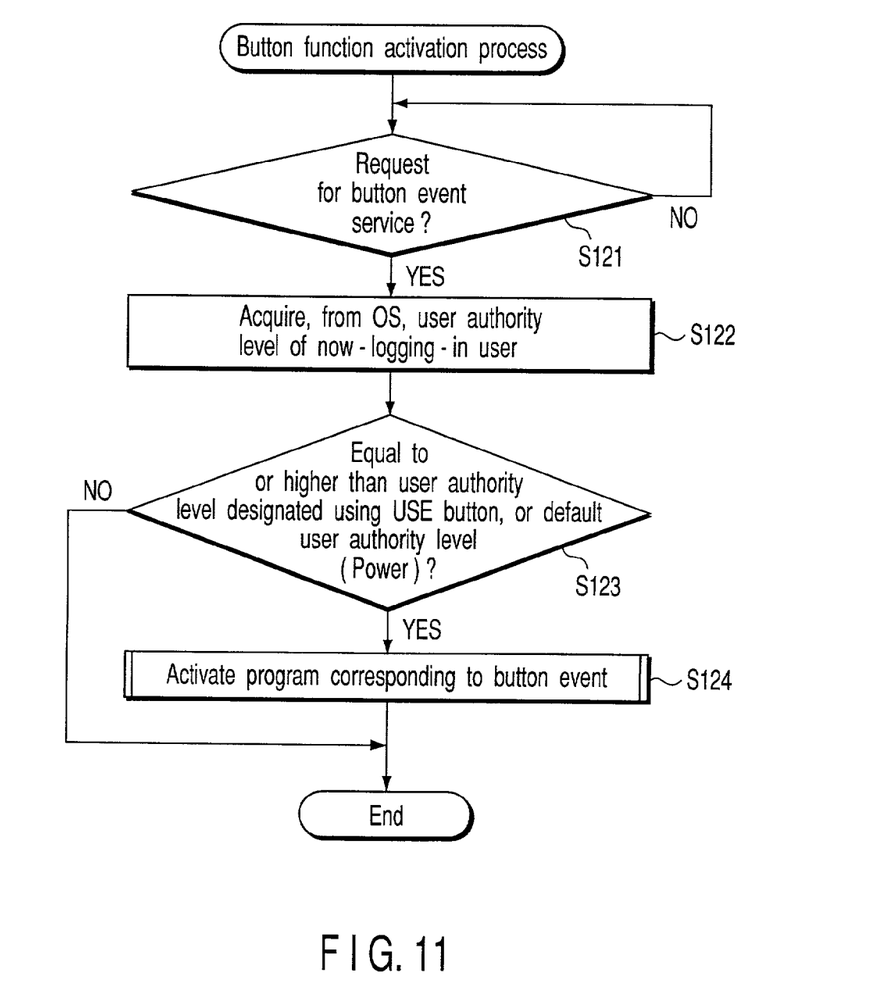
FIG. 11 is a flowchart illustrating an example of the button function execution process in the computer of the embodiment.

Referring to the flowchart of FIG. 11, a description will be given of an example of a button function execution process by the button function management program 307.

Upon receiving a button event service request from the BIOS 306 via the OS 301 (step S121), the button function management program 307 acquires, from the OS 301, information indicative of the user authority level of the user who is logging in, thereby determining the user authority level of the user who has pushed the Internet button 115 or In Touch button 116 (step S122).

Subsequently, the button function management program 307 acquires the user authority level registered as the "button function usable authority level" in the configuration file 305, and compares it with the user authority level of the user who has pushed the Internet button 115 or In Touch button 116 (step S123). The user authority level acquired from the configuration file 305 is the user authority level designated using the button icon "USE Button" 701, or the default value of the "button function usable authority level" (=Power User).

If the user authority level of the user who has pushed the button is not lower than that acquired from the configuration file 305 (YES of the step S123), the execution of a button function activation process for activating a program assigned to the pushed button is allowed. In this case, the button function management program 307 acquires, from the configuration file 305, information ("execution file" or "data file" name, and directory path information) concerning a program corresponding to the pushed button, thereby requesting the OS 301 to activate the program. As a result, the program assigned to the pushed button is executed.

On the other hand, if the user authority level of the user who has pushed the button is lower than that acquired from the configuration file 305 (NO of the step S123), the execution of the button function activation process for activating the program assigned to the pushed button is inhibited.

Further, as described above, the user authority level determination may be executed at the time of log-in, thereby invalidating the button event function if the user authority level of the log-in user is lower than the button function usable authority level, and validating the button event function if the former is not lower than the latter.

In the above-described embodiment, a mechanism for permitting or inhibiting the execution of the button function setting process depending upon the user authority level of the user who is logging in is realized. This mechanism enables authority control in which, for example, only the management user can set and change the button function, and the other users cannot do so. As a result, the management cost of the information-processing apparatus in office can be reduced. Furthermore, degradation of security caused, for example, by a user assigning a virus-infected program to a button can be avoided. Accordingly, the range of use of the button function can be appropriately limited without reducing the convenience of the function.

Although in the embodiment, the buttons 115 and 116 are provided on the computer body 11, they may be provided on an external keyboard, for example. The control of limiting the range of use of the button function and the range of execution of the button function setting process can be applied to any button for instructing the computer to execute a function incorporated therein.

In addition, since the control of the button function in the embodiment is all achieved by a computer program, the same advantage as the embodiment can be easily obtained from any computer provided with a button function, if the program is stored in a computer-readable recording medium, and the recording medium is inserted into the computer.

The present invention is not limited to the above-described embodiment, but can be modified in various ways without departing from its scope.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable computer including a hardware button that is provided on a main body of the portable computer and to which a program is assigned, comprising:
    means for executing the program in response to an operation of the hardware button;
    means for inhibiting the program from being executed, when an authority level of a user who has operated the hardware button is lower than a first authority level with which the user is allowed to use the hardware button;
    means for executing a button function setting process based on a request for setting of a button function for executing the program, the button function setting process including a process to assign a program to the hardware button and a process to change the program assigned to the hardware button to another program; and
    means for inhibiting the button function setting process from being executed, when an authority level of a user who has made the request for the setting of the button function is lower than a second authority level with which the user is allowed to use the button function setting process.

2. The computer according to claim 1, wherein the button function setting process further includes a process to enable or disable the button function based on the request for the setting of the button function.

3. The computer according to claim 1, wherein the button function setting process further includes a process to change the second authority level based on the request for the setting of the button function.

4. The computer according to claim 1, wherein:
    the means for executing the program includes a controller which generates a button event indicative of the operation of the hardware button, in response to the operation of the hardware button, and means for receiving the button event generated by the controller, and requesting an operating system, operating in the computer, to activate the program corresponding to the hardware button;
    the button function setting process includes a process to enable or disable the button function based on the request for the setting of the button function; and
    the means for executing the button function setting process includes means for inhibiting the controller from generating the button event if the request for the setting of the button function requests disable of the button function.

5. A method of controlling a button function for executing a program assigned to a hardware button provided on a portable computer, comprising:
    executing the program in response to an operation of the hardware button;
    inhibiting the program from being executed, when an authority level of a user who has operated the button is lower than a first authority level with which the user is allowed to use the button;
    executing a button function setting process based on a request for setting of the button function for executing the program, the button function setting process including a process to assian a program to the hardware button and a process to change the program assigned to the hardware button to another program; and
    inhibiting the button function setting process from being executed, when an authority level of a user who has made the request for the setting of the button function is lower than a second authority level with which the user is allowed to use the button function setting process.

6. A program stored in a storage medium for causing a portable computer to control a button function for executing a program assigned to a hardware button provided on the portable computer, comprising:
    causing the computer to execute the program in response to an operation of the hardware button;
    causing the computer to inhibit the program from being executed, when an authority level of a user who has operated the hardware button is lower than a first authority level with which the user is allowed to use the hardware button;
    causing the computer to execute a button function setting process based on a request for the setting of the button function, the button function setting process including a process to assign a program to the hardware button and a process to change the program assigned to the hardware button to another program; and
    causing the computer to inhibit the button function setting process from being executed, when an authority level of a user who has made the request for the setting of the button function is lower than a second authority level with which the user is allowed to use the button function setting process.

* * * * *

UNITED STATES PATENT AND TRADEMARK OFFICE
CERTIFICATE OF CORRECTION

PATENT NO. : 7,002,554 B2
DATED : February 21, 2006
INVENTOR(S) : Numano et al.

It is certified that error appears in the above-identified patent and that said Letters Patent is hereby corrected as shown below:

Column 12,
Line 21, change "assian" to -- assign --.

Signed and Sealed this

Twenty-fifth Day of April, 2006

JON W. DUDAS
*Director of the United States Patent and Trademark Office*